(12) United States Patent
Nemeth (10) Patent No.: US 7,050,905 B2
(45) Date of Patent: May 23, 2006

(54) NAVIGATION SYSTEM WITH UPDATING SEGMENTS

(75) Inventor: Zoltan Nemeth, Bochum (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/451,511

(22) PCT Filed: Feb. 16, 2001

(86) PCT No.: PCT/EP01/01759

§ 371 (c)(1),
(2), (4) Date: Oct. 16, 2003

(87) PCT Pub. No.: WO02/50496

PCT Pub. Date: Jun. 27, 2002

(65) Prior Publication Data

US 2004/0117108 A1     Jun. 17, 2004

(30) Foreign Application Priority Data

Dec. 21, 2000  (GB) .................................. 0031374.2

(51) Int. Cl.
*G06F 19/00* (2006.01)
(52) U.S. Cl. ....................... 701/201; 701/207; 701/208; 701/210; 701/213
(58) Field of Classification Search ............ 701/23–25, 701/26, 28, 206, 207–208, 210, 213
See application file for complete search history.

(56) References Cited

U.S. PATENT DOCUMENTS 5,638,280 A * 6/1997 Nishimura et al. ......... 701/209
5,818,356 A * 10/1998 Schuessler ............. 340/995.12
5,933,100 A * 8/1999 Golding ................. 340/995.13
6,072,874 A * 6/2000 Shin et al. .................. 380/231
6,088,594 A * 7/2000 Kingdon et al. ............ 455/457
6,169,515 B1 * 1/2001 Mannings et al. ....... 342/357.1
6,278,939 B1 * 8/2001 Robare et al. .............. 701/208
6,292,745 B1 * 9/2001 Robare et al. .............. 701/208
6,381,535 B1 * 4/2002 Durocher et al. ........... 701/202
6,405,123 B1 * 6/2002 Rennard et al. ............ 701/200
6,405,132 B1 * 6/2002 Breed et al. ................ 701/301
6,430,624 B1 * 8/2002 Jamtgaard et al. .......... 709/246
6,434,482 B1 * 8/2002 Oshida et al. .............. 701/209

FOREIGN PATENT DOCUMENTS

| DE | 19611915 A1 | 10/1997 |
| EP | 1387145 A1 * | 2/2004 |
| FR | 2761837 A1 | 10/1998 |
| FR | 2774468 A1 | 8/1999 |
| JP | 10047922 A * | 2/1998 |
| JP | 20000284685 A * | 10/2000 |
| JP | 2003269980 A * | 9/2003 |

(Continued)

OTHER PUBLICATIONS

Werner et al., Modelling navigational knowledge by route graphs, publishing year 2000, from Dialog(R) File 34, acc. No. 09205288.*

(Continued)

*Primary Examiner*—Cuong Nguyen
(74) *Attorney, Agent, or Firm*—Harrington & Smith, LLP (57) ABSTRACT

The invention relates to route guidance for navigation terminals. A navigational system calculates a route from a start location to a destination. The route is divided into segments and sequentially delivered to a mobile navigational terminal remote from the stored segments at respective points in the calculated route.

45 Claims, 8 Drawing Sheets

FOREIGN PATENT DOCUMENTS

| | | | |
|---|---|---|---|
| WO | WO-96/14558 A1 | | 5/1996 |
| WO | WO 97/36148 | * | 10/1997 |
| WO | WO 98/45823 | * | 10/1998 |
| WO | WO-98/54682 A1 | | 12/1998 |
| WO | WO-00/10029 A1 | | 2/2000 |
| WO | WO 200046776 A1 | * | 8/2000 |
| WO | WO 200074019 A1 | * | 12/2000 |
| WO | WO-01/15117 A1 | | 3/2001 |

OTHER PUBLICATIONS

Ibrahim D., GPSIM: A personal computer-based GPS simulation system, Journal of Navigation, 1999, v52, n1(JAN), P126-135 Jan. 1999 (from Dialog(R) File 34, acc. No. 07525248).*

Witmer, BG; Kline, PB, Judging perceived and traversed distance in virtual environments, US Army Res. Inst. for the Behaviora and Social Sci., Orlando, USA, Presence, v7, n2, pp. 144-167, 1998.*

Albert W,S., et al., The role of attention in spatial learning during simulated route navigation, Environment and Planning A, 31/8 (1459-1472), 1999, (from Dialog Classic, File 292, acc. No. 00907348).*

Microsoft Press, p. 53 of Microsoft Press Computer Dictionary, 3rd ed., Microsoft Corporation, 1997.*

Todd, T., Ferman force costly transport reform, TRANSPORT, vol. 13, Issue 5, Unnown published date (from DialogClassic Web(tm) file 63, acc. No. 00632739).*

Unknown author, Department of Transportation's intelligent vehicle highway systems projects, US Federal Highway Administration, FHWA-SA-93-027, p. viii, 197 [6], published year 1993 (from DialogClassic Web9tm) file 63, acc. No. 00773320).*

Leonessa A. et al., Design of a small, multi-purpose, autonomous surface vessel, IEEE Conf., Published on 2003 (from DialogClassic Web(tm), file 2 acc. No. 09008395).*

Tsekeris T. et al., Quasidynamic network assignment procedure with transient demand matrices, Journal of Transportation Engineering, 131/2 (89-100), 2005 (from DialogClassic Web(tm) file 292, acc. No. 01405739).*

* cited by examiner

```
<card id="card1" title="navigation" ontimer="#scr_card">
        <timer value="10"/>
        <p align="center">
                <img src="../wbmp/u_turn.wbmp" alt="u_turn"/><br/>
                $(distance) $(unit)<br/>
        </p>
</card>
```

FIG. 7a

```
<card id="scr_card">
        <onevent type="onenterfroward">
                <go href="../navi.wmls#getActualPosAndComp('turn3.wml')"/>
        </onevent>
</card>
```

FIG. 7b

NAVIGATION SYSTEM WITH UPDATING SEGMENTS

The invention relates to route guidance for navigation terminals. When designing a route guidance system there are a number of considerations that need to be taken into account. One consideration is how the information is stored to allow a route to be calculated. In some systems the available routes are stored locally eg on a CD and this is used to calculate a route based on the start point and a destination point. This has the disadvantage that information held on a CD will become increasingly out-dated over time and the user will need to regularly update the data stored. Such systems will never be able to provide information allowing a journey to be made that avoids transitory road blockages eg road works or accidents. In other systems a central database is used to calculate routes. These can be more easily updated but the difficulty is then how does the route information get transferred to allow the journey to be followed. In order for route information eg distance and time to destination to be calculated, the route is stored at the navigation terminal. Despite the greater ability to update routes as a result of changes in conditions that can be captured by a central database these updates are accomplished by amending information already sent to the navigation terminal. One such system is described in PCT/FR98/00557.

A problem with route changes under these circumstances is that each time the route changes a new set of route guidance instructions must be sent to the navigational terminal, these have to be accepted and integrated with the existing information or alternatively the whole route or remainder of the route needs to be transferred again. This increases the complexity or redundancy of the process.

Dynamic route guidance is likely to play an important role in the future in allowing traffic flow to be optimized to take account of real traffic situations rather than estimates and predictions.

In accordance with a first aspect of the present invention there is provided a navigational system comprising: means for calculating a route from a start location to a destination; means for dividing the calculated route into segments; means for storing the respective segments; a mobile navigational terminal remote from the stored segments; and means for sequentially delivering respective segments to the mobile navigation terminal at respective points in the calculated route.

In accordance with a second aspect of the present invention there is provided a navigation terminal comprising: means for providing a current location; means for storing a route segment; means for providing route guidance from the stored route segment; and means responsive to the current location for requesting a subsequent route segment.

In accordance with a third aspect of the present invention there is provided a navigational service provider comprising: means for calculating a route based on start and destination data; means for storing the route divided into respective segments; and means for sequential delivery of a respective segments at respective predetermined points in the calculated route.

The respective segments may be delivered in response to a respective requests from the terminal. This has the advantage that the terminal will be travelling the route and so greater accuracy in delivery can be achieved.

In accordance with a fourth aspect of the present invention there is provided a method of providing route information to a remote terminal comprising: calculating a route from a start point to a destination; dividing the route information into a plurality of segments; storing the route segments; and sequentially delivering respective segments to the remote terminal at respective predetermined points in the calculated route.

In accordance with a fifth aspect of the present invention there is provided a method of remotely receiving a route from a start point to a destination in segments from a service provider comprising: receiving a first segment of the route; determining the current location on the route; requesting a subsequent segment of the route if a particular point in the downloaded route is reached; and receiving the subsequent segment of the route.

One of the advantages of embodiments of the invention is that with the route information being downloaded in segments, the amount of information sent to the terminal can be tailored to fit with the memory capacity of a mobile terminal. This allows the invention to be utilised in a vast array of situations, not only those where a relatively large memory capacity device is available such as a specially built in-car route guidance system. The present invention can be utilised in relatively small memory capacity devices such as mobile terminals that will allow the invention to be utilised not only for journeys in a car but also for trips where luggage is restricted such as bicycle or walking tours.

Another advantage of embodiments of the present invention is that as the route guidance is downloaded in segments, the segments still to be transmitted are stored on a central database. This means they can be readily updated if the traffic situation changes. No corrections need to be transmitted to the travelling terminal which reduces the complexity required at the handset.

Further advantages are achieved by storing segments as WAP decks, in that a universal protocol is used to provide the information.

The invention will now be described in greater detail with reference to FIGS. 1 to 7 of the drawings in which.

Figure 1:
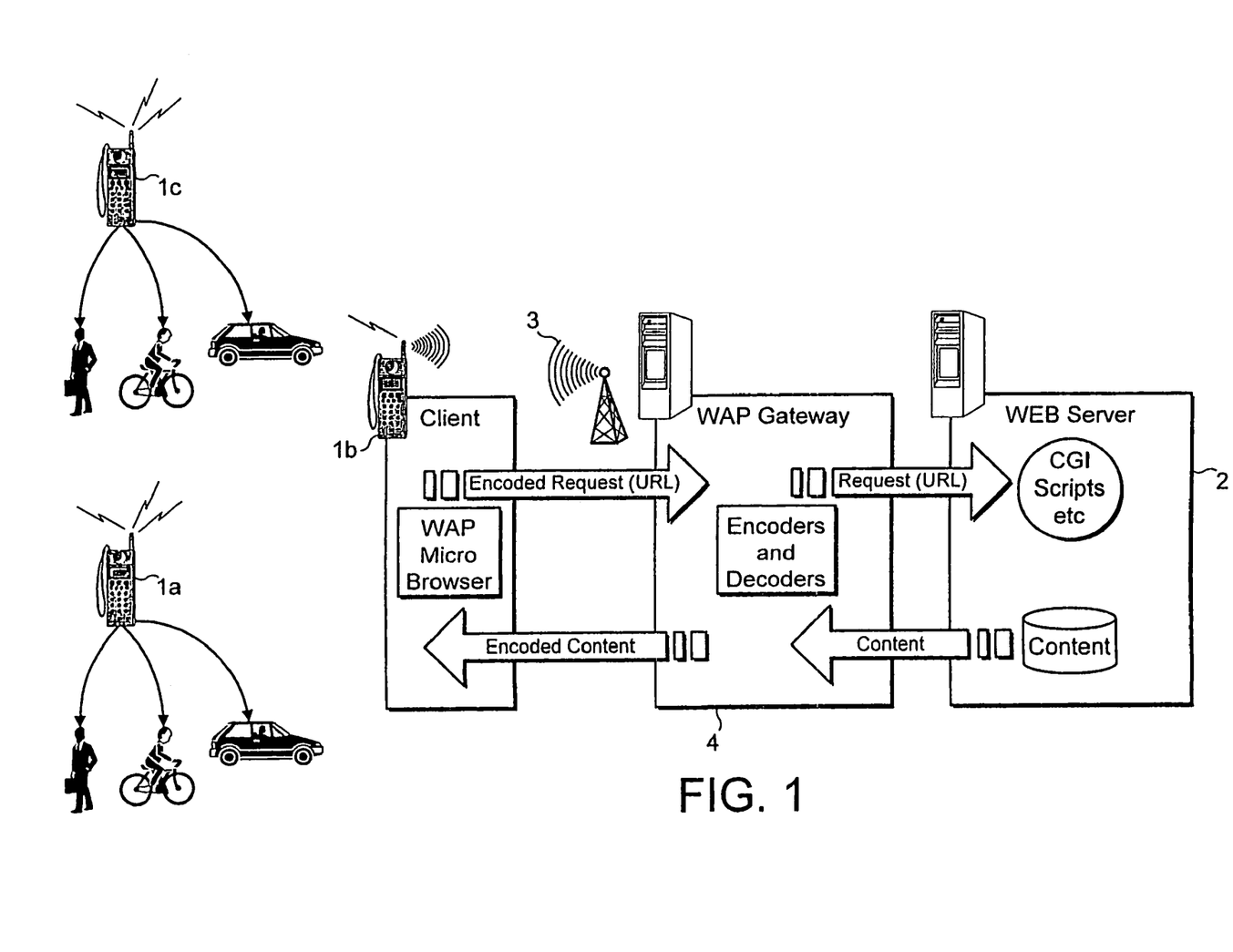
FIG. 1 is schematic representation of a system capable of providing route guidance information to a mobile terminal.

FIG. 1 is a schematic representation of a dynamic route guidance system in accordance with an embodiment of the present invention. Terminals 1*a*, 1*b*, 1*c* are able to contact a web server 2 providing a route guidance system through a telecommunications network 3 and a WAP gateway or proxy server 4. This gateway allows a mobile terminal to communicate with the internet to access information despite the fact that the modes of communication of the two devices are different.

In this particular embodiment, the terminals 1 are Wireless Application Protocol (WAP) enabled mobile terminals and the gateway 2 provides a link between the WAP architecture of the terminal and the internet architecture of the web server 3. Communication between the WAP enabled terminals 1 and the gateway 4 is, in this particular embodiment, in accordance with the Wireless Application Protocol (WAP).

WAP defines a set of standard protocols that enable communication between wireless communication terminals, such as cellular phones and network servers. Other types of communication terminals could be pagers and personal digital assistants. WAP uses a standard naming model according to which standard Internet Uniform Resource Locators (URLs) are used to identify content on different web servers. A URL provides an access point that indicates the location of the server to be accessed. WAP also uses content typing. All WAP content is given a specific type consistent with WWW typing which allows a wireless terminal to correctly process the content based on type. WAP also uses standard content formats and standard communication protocols. Thus, WAP brings Internet content and advanced data services to wireless terminals. WAP can work across differing wireless network technologies and bearer types (TDMA, CDMA, SMS). Communication between the web server 4 and the gateway 2 is according to WWW protocols.

The wireless communication terminal differs from a desktop or a portable computer with Internet facilities in that generally it has a less powerful CPU, less memory, restricted power consumption, smaller displays and more limited input devices. The wireless network differs from the Internet network in that it generally has less bandwidth, more latency, less connection stability and less predictable availability. The WAP architecture is optimised for narrow bandwidth bearers with potentially high latency and is optimised for efficient use of device resources.

Figure 2:
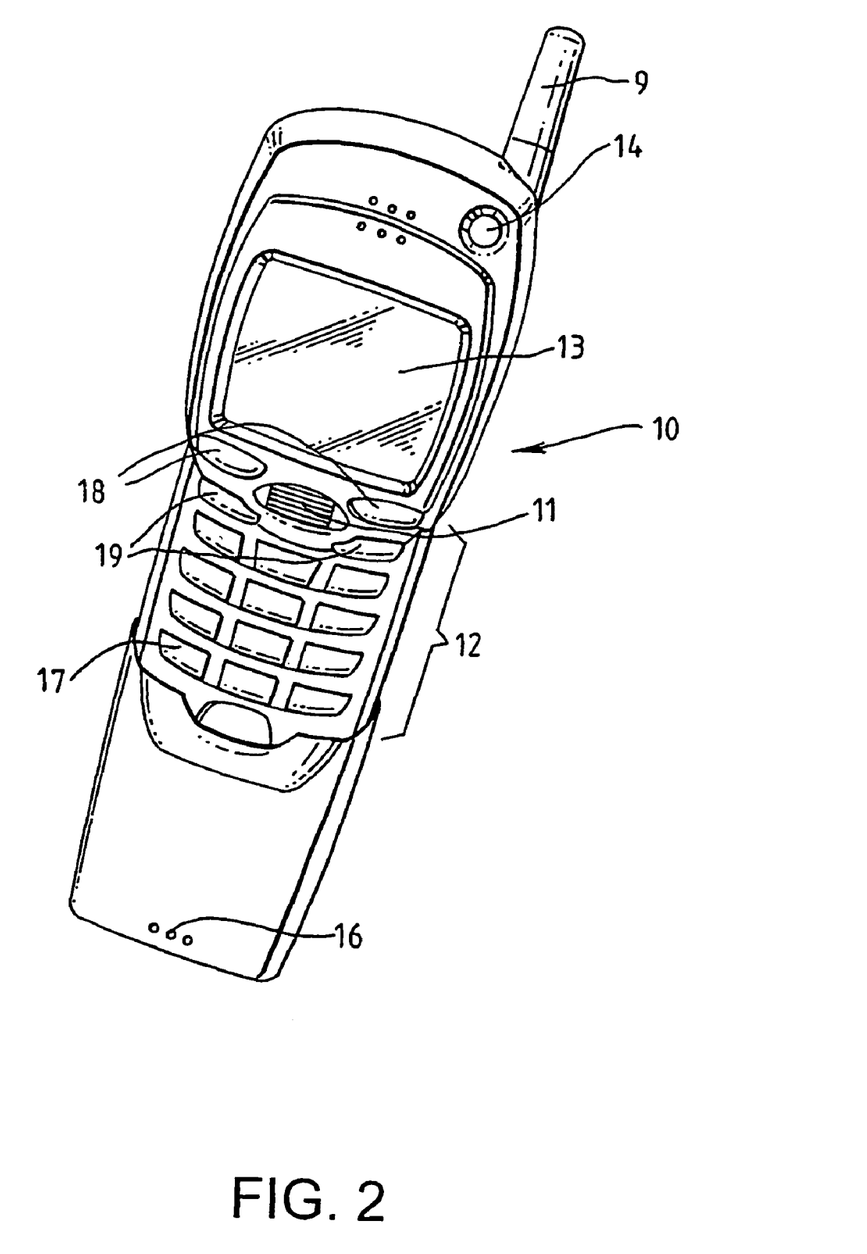
FIGS. 2 and 3 are schematic representations of a navigation terminal suitable for embodiments of the present invention.
Figure 3:
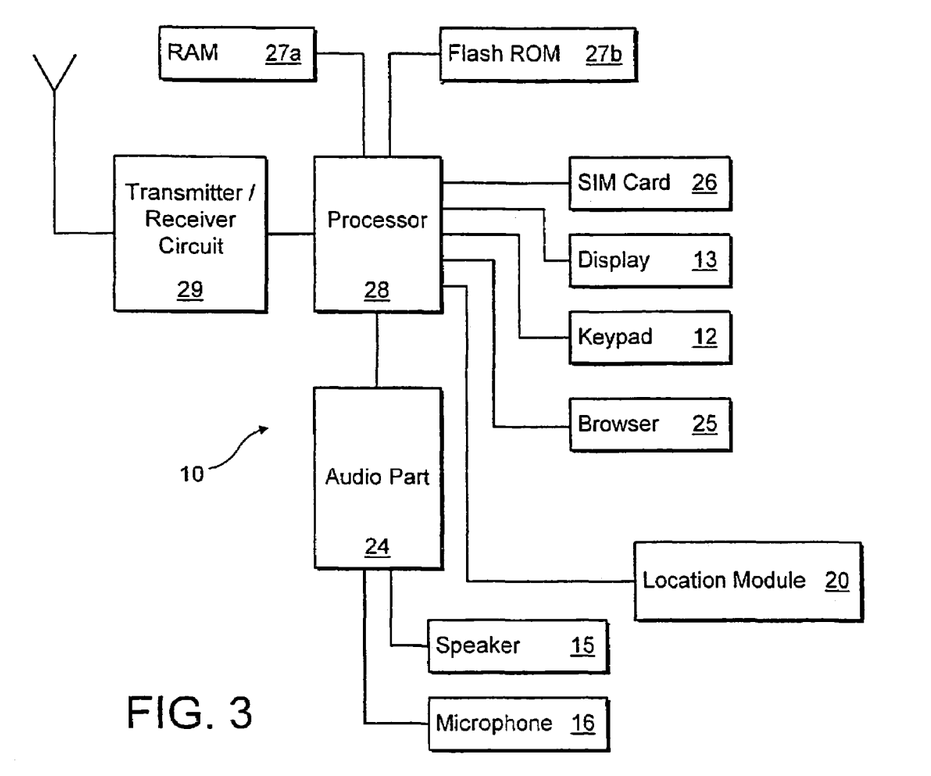

A WAP enabled terminal 1 suitable for the present invention is shown in greater detail in FIGS. 2 and 3. FIG. 2 shows a WAP enabled wireless communication terminal 10. The wireless terminal, which is generally designated by 10, comprises a user interface having a keypad 12, a display 13, an on/off button 14, an antenna 9, a speaker 15, and a microphone 16. The wireless terminal 10 is adapted for communication via a wireless telecommunication network, e.g. a wireless network. However, the wireless terminal could also have been designed for a cordless network. The keypad 12 has a first group 17 of keys as alphanumeric keys, for entering telephone numbers, writing text messages (SMS), writing names (associated with phone numbers), etc. Each of the twelve alphanumeric keys 17 is provided with a figure "0–9" or a sign "#" or "*", respectively. In an alpha mode each key is associated with a number of letters and special signs used in text editing. The keypad 12 additionally comprises two soft keys 18, two call handling keys 19, and a navigation key 11.

The functionality of the soft keys may depend on the state of the wireless terminal and position within the menu accessed using the navigation key 11. The current functionality of the soft keys 18 can be shown in separate fields in the display 13 just above the respective keys 18.

The two call handling keys 19 are used for establishing a call or a conference call, terminating a call or rejecting an incoming call.

The navigation key 11 may be a scroll key and is, in the handset illustrated placed centrally on the front surface of the wireless terminal between the display 13 and the group of alphanumeric keys 17. In this example the scroll key is a roller key, which is arranged to rotate in one or several directions. The roller allows the user to roll the key to scroll between different items in a menu.

FIG. 3 shows schematically and functionally elements of the wireless terminal 10. The microphone 16 records the user's speech, and the analogue signals formed thereby are A/D converted by an A/D converter before the speech is encoded in an audio part 24. The encoded speech signal is transferred to processor 28. The processor 28 may support software in the phone. The processor 28 also forms the interface to peripheral units of the apparatus. These may include a Random Access Memory (RAM) 27a and a Flash Read Only Memory (ROM) 27b, a SIM card 26, the display 13, a browser application 25, a location module 20 and the keypad 12.

The browser application 25 can be used to request and receive information from the internet via the gateway 4 illustrated in FIG. 1. The client 1 is provided in an environment, which makes it possible to reach a wide variety of different wireless platforms, e.g. World Wide Web (WWW). The environment provided may be referred to as Wireless Application Environment (WAE). The processor 28 communicates with a transceiver 29, e.g. a circuit which is adapted to send and receive messages in a telecommunication network. The telecommunications network may be a GSM network, but the invention may also be applied in connection with other networks, such as other kinds of wireless networks and various forms of cordless phone systems or in dual band phones accessing sets of these systems/networks. The audio part 24 speech-decodes the signal, which is transferred from the processor 28 to the earpiece 15 via a D/A converter.

The location module 20 enables the terminal 1 to determine its current position. This is clearly advantageous in route navigation applications as it requires less knowledge to be supplied by the person negotiating the route. The location module 20 may be a Global Position System (GPS) receiver. For a terminal in for example the GSM network it could use information from cells in the vicinity to determine its location.

Returning to FIG. 1, The wireless network 3 is arranged to establish a wireless connection between a plurality of wireless terminals 1 and gateway 4. The gateway is usually connected to a server to be accessed, it is, however, possible that the gateway may be integrated together with the server to be accessed, as well.

The terminals 1 are able to access at least one web server 2, via the gateway 2. The web server 2 is arranged to receive and/or transmit data packets from/to a terminal. The transfer of data packets is often mentioned as pull and/or push. One way of understanding a pull is to consider the terminal using an access point to access a site where e.g. the location information is stored, and retrieve it. A push can be considered to be the server transferring updated location information to the terminal without the terminal specifically requesting it.

In this embodiment, the gateway 4 translates, i.e. formats, requests for location information from a WAP protocol stack used by the wireless terminal 300 to a WWW (World Wide Web) protocol stack used by the web server. When transporting content between the client 1 and the server 2, the content is transported using a set of standard communication protocols based on the WWW communication protocols known as the Wireless Datagram Protocol (WDP). The web server leaves a response with an indication of the location information, which can for example return WAP content such as WML (Wireless Markup Language)—a lightweight Markup language, similar to HTML, but optimised for use in hand-held mobile terminals, WMLScript—a lightweight scripting language, similar to JavaScript™, XML (Extensive Markup Language) and/or WWW content such as HTML (HyperText Markup Language). In the later case a filter is used to translate, i.e. format, the WWW content to WAP content e.g. HTML to WML, WMLScript or XML.

The encoding/decoding means is typically provided in the browser application of the terminal. The browser can use Wireless Markup Language (WML) and a lightweight markup language, WMLScript a lightweight scripting language. WML implements a card and deck metaphor. In WAP the interaction of the browser and user is described in a set of cards which are grouped together into a document commonly referred to as a deck. Generally the user navigates to a card in a deck, reviews its content and then navigates to another card in the same, or a different, deck. The user may also be able to enter requested information, make choices, and move on to another card. Information is generally downloaded to a terminal one deck at a time. Decks of cards are transferred from origin servers as needed.

The server 2 supporting the Wireless Application Protocol is connected to a gateway 4 or, the gateway and server may be implemented together. The gateway 4 is also a kind of server, which identifies and encodes/decodes information between the client 1 and the server computer 2. This means that the gateway 4 is provided with encoders and decoders. In addition, the server 2 may comprise different algorithms to carry out encrypting/decrypting The encrypting/decrypting itself may be performed by well-known methods, e.g. RSA, Diffie-Hellman, etc. The server computer 2 may comprise different scripts to support WAP and data to be accessed by the client. This data may comprise all kinds of information, e.g. weather reports, news, information from stock markets, etc.

In order to access the server computer 2, from the client 1, the server 2 is connected to a wireless telecommunication network 3, e.g. a cellular telephone network. The network 3 is able to identify the client 1. This could be achieved by e.g. a database, comprising information about different subscribers to the network. Thus, when a client 1 tries to establish a connection to the network, the network determines if the client 1 is stored in the database in which case access is allowed to the network 3. The manner by which a client 1 establishes a connection to the network 3 is well known in the art.

Once a connection has been established to the network 3, and the client 1 is operating in the WAE then data can be transported between the client 1 and server 2 via the gateway 4 at the request of a user of the client 1.

In the future it will be possible to set the amount of information, ie number of cards in a deck, to coincide with the available memory capacity of the WAP terminal. At present WML decks are limited to 1400 bytes. For embodiments of the invention implemented using WAP in the future, route information can be divided into decks that have at most the maximum memory capacity in bytes of information for the WAP enabled terminal. The decks for each calculated route are stored at the service provider.

In this embodiment of the invention, the route information is stored in cards including WMLScript functions. The journey or route can be divided into a series of instructions that basically give a distance and a turning instruction. WMLScript is particularly suited to this type of information. WML Script functions are used for retrieving the actual position of the terminal and for computing the distance between the actual position and the position of the next turning instruction or decision point. The WML Script is responsible for determining if the next turning instruction (card) has to be shown or not. The different turning instructions are saved inside WML cards. Each turning instruction is described with one WML card. A WML deck is used for describing a route segment, which contains a certain amount of turning instruction (cards).

Figure 4:
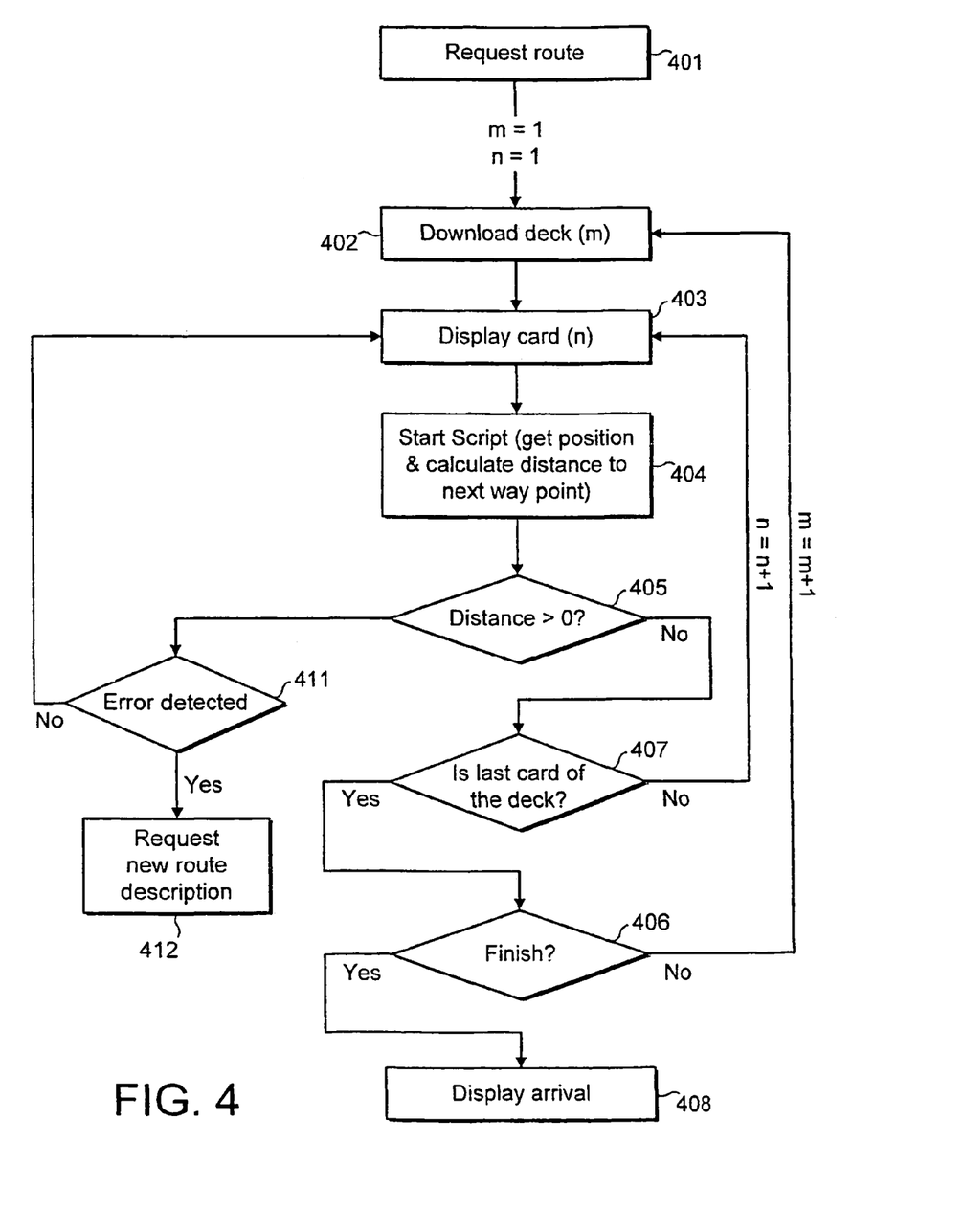
FIG. 4 is a flow chart illustrating operation of a terminal of an embodiment of the invention.
Figure 5:
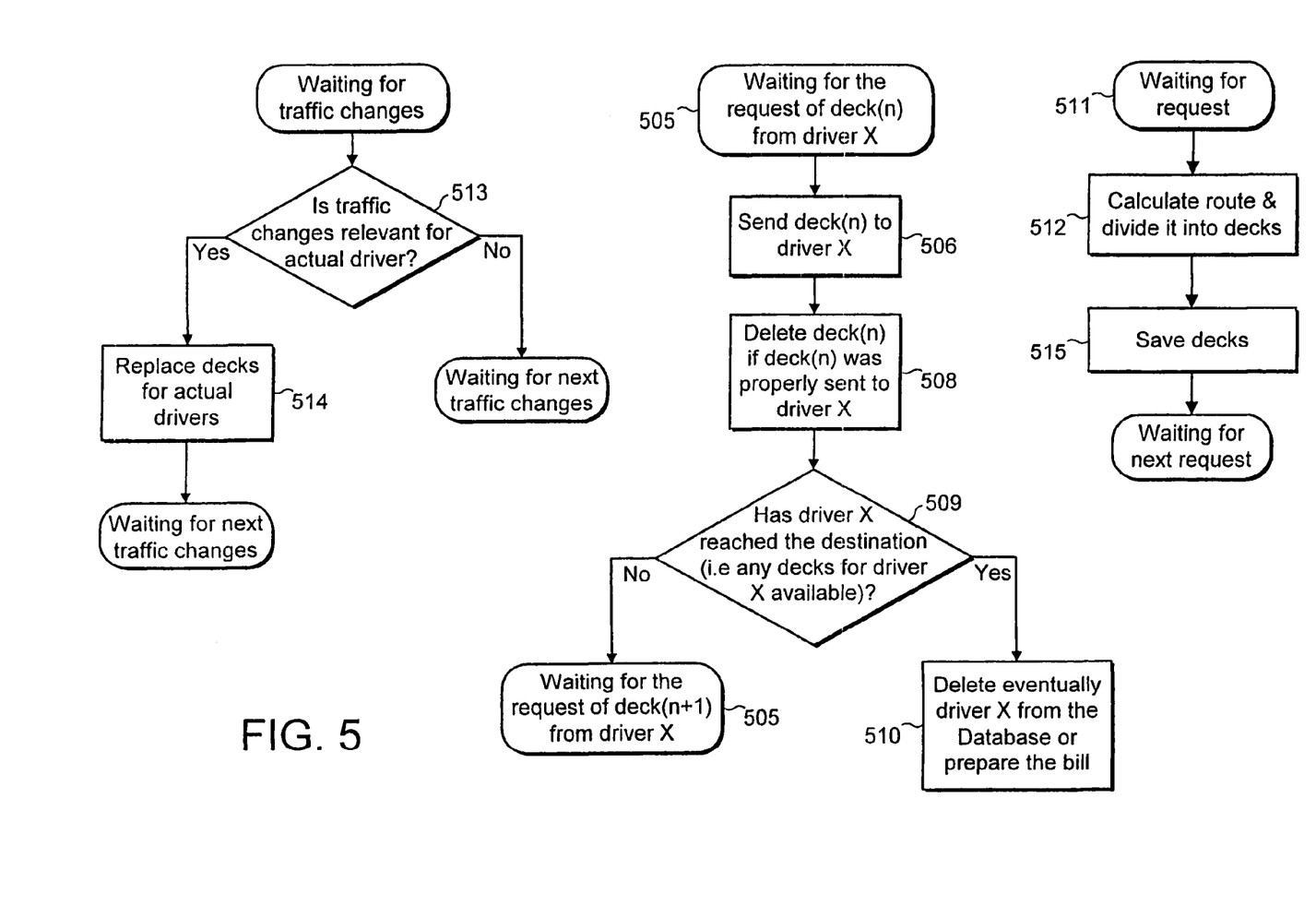
FIG. 5 is a flow chart illustrating operation of a service provider of an embodiment of the invention.
Figure 6A:
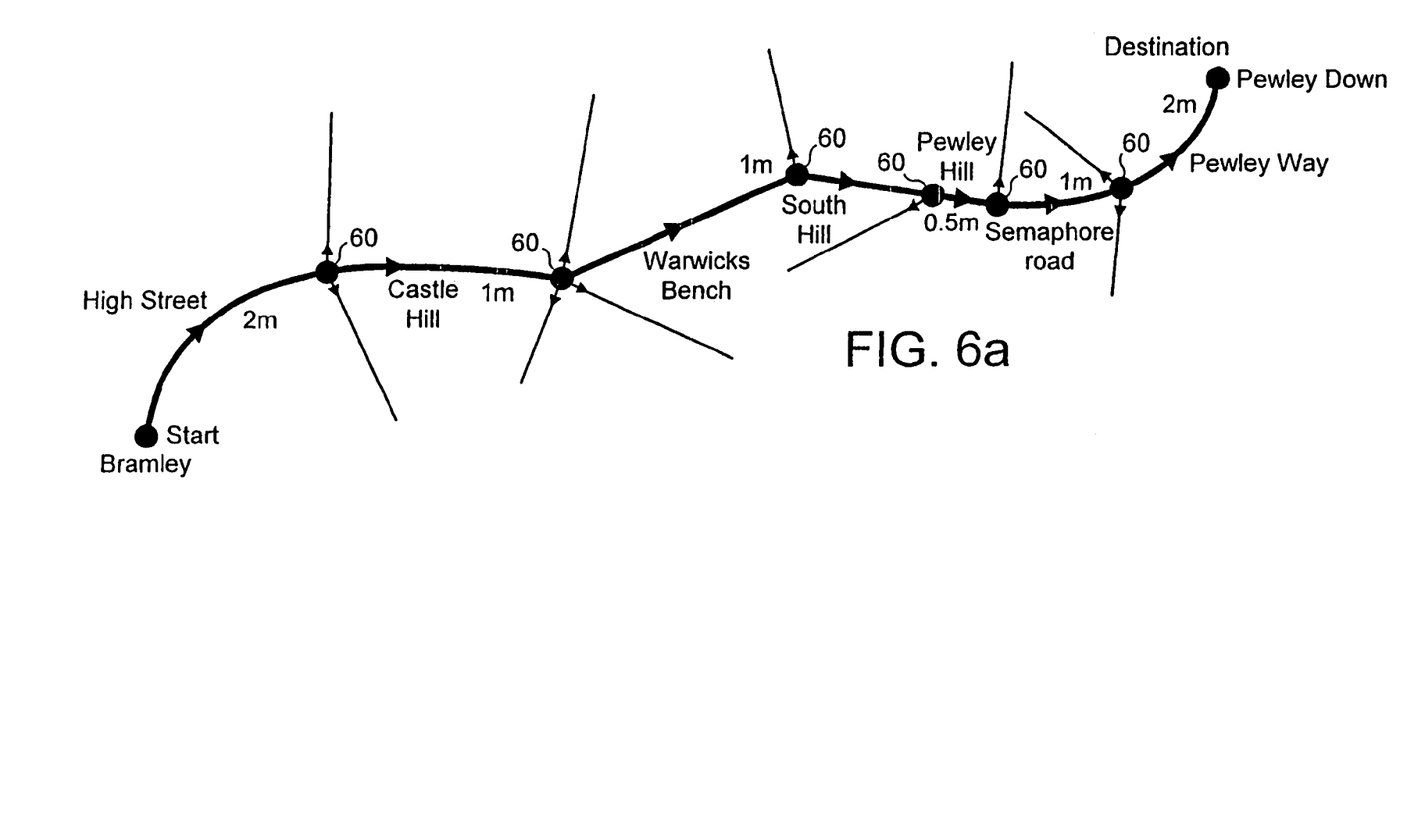
FIGS. 6*a* and 6*b* illustrate a requested route and the screen-by screen depiction of the route at the terminal of an embodiment of the invention.
Figure 6B:
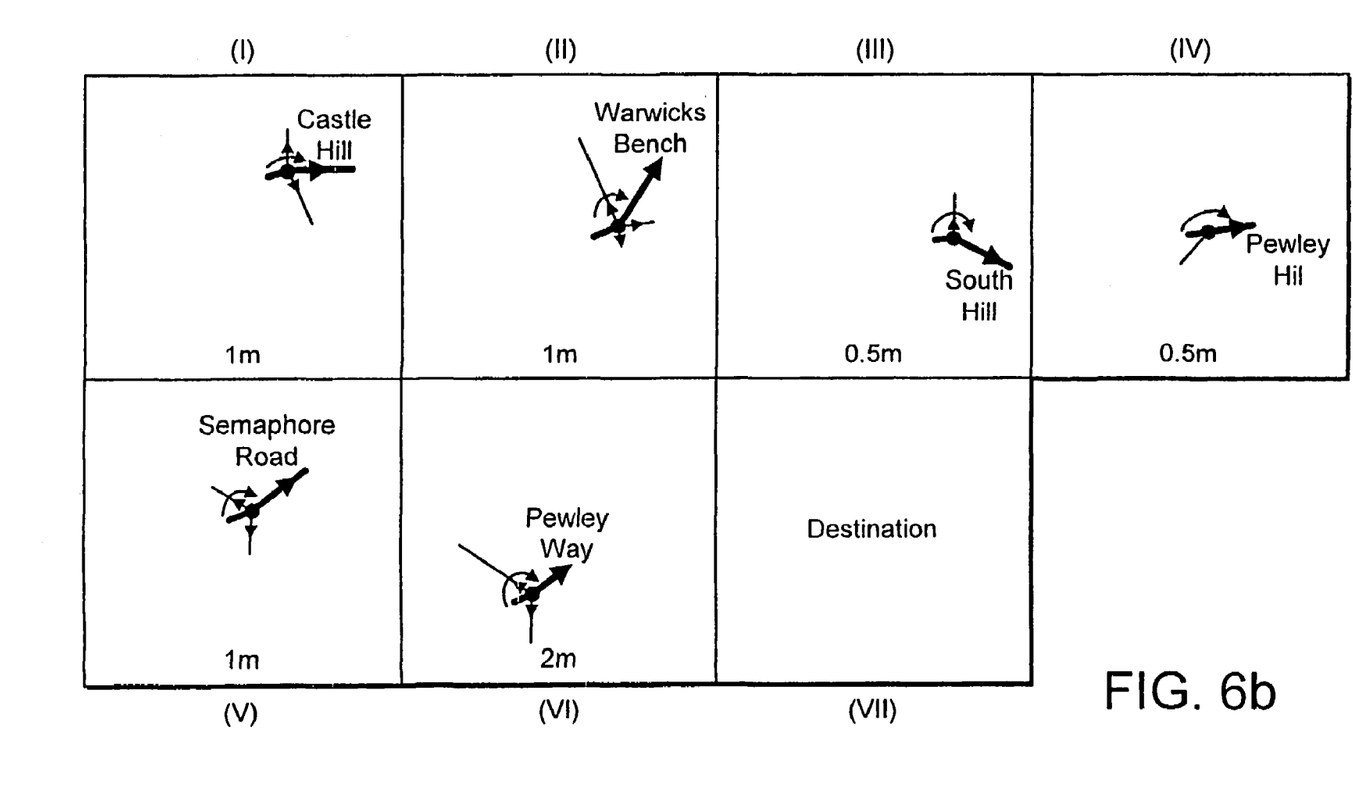

An example of route guidance using the present invention will now be described with reference to FIGS. 4 to 6. All reference numerals on FIG. 4 start with the numeral 4 and all reference numerals on FIG. 5 with the numeral 5. FIG. 4 describes the process from the terminal user's perspective and FIG. 5 describes the process from the service provider's perspective.

The web server 2 has a database 6 holding up-to-date information on routes and the traffic situation for a predetermined area. For the UK such a data would ideally cover the road network for the entire of the United Kingdom. The service provider 2 would also include a memory that would store respective routes for all navigation terminals currently using the service provider's services.

Because the whole route is stored at the service provider where there are fewer restrictions on memory capacity, rather than at the WAP terminal, this allows a WAP terminal with a relatively restricted memory capacity, say 1300 bytes limit, to be used to provide route information.

A user of a WAP enabled terminal requests a route 401 by sending at least a start point and a destination to a service provider via the WAP terminal 1. The Start Point could be the current location in which case it may be sent automatically by a WMLScript function. The request includes sufficient information for the service provider to be able to establish the identity of the requester for sending the requested information and for billing. The start point could be established by a current position. Other criteria for the route eg scenic, fastest, flattest, could be provided with the requesting information.

Figure 7A:
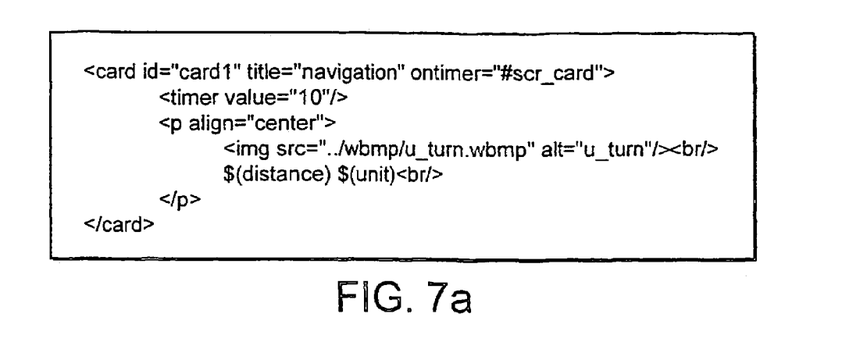
FIGS. 7*a* and *b* illustrate cards in accordance with embodiments of the invention.
Figure 7B:
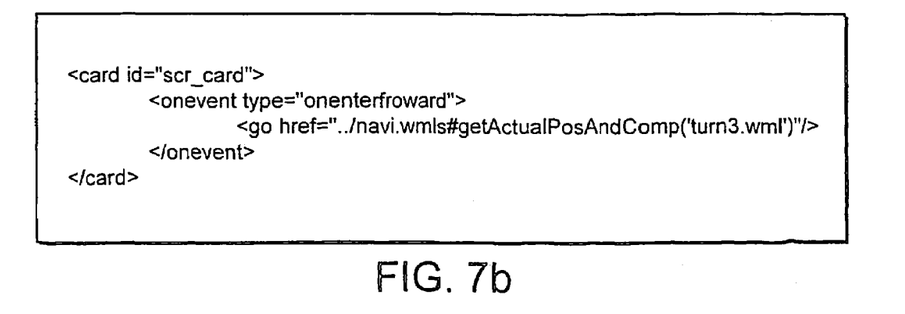

On receiving a request 501 the service provider calculates and downloads a route between the start and destination points meeting those criteria provided in the request 502. The route is divided into a number of decision points 60, illustrated in FIG. 6a. These decision points are road junctions or other points where a decision as to which way to turn must be made. The service provider divides the route 602 into individual instructions and stores the instructions in WML decks at the service provider 603. Each card of the deck may contain one turning instruction, of the order of 7 turning instructions may be available on one deck. See FIGS. 7a and 7b.

When the entire route has been stored at the server, the first deck is transmitted to the requesting terminal 504. The terminal receives the first deck and stores it in a cache memory, which may be flash ROM. The terminal then displays the next card of the deck 403, which will be the first card of the deck. In FIG. 6b(i)-6b(vi) the segments of an entire route can be seen. FIGS. 6b(I) to 6b(iv) in a first deck and FIGS. 6b(v) to 6b(vii) in a second deck. Each screen displays a turning point or instruction the street name after the turning point and a distance. Additional journey information may also be displayed if it has been stored. As the terminal does not receive the entire route, the travel time and distance is not calculated locally, although it could be for segments of the route. If such information is to be provided by the service provider it is transmitted to the traveller in, for example, the first deck. It could subsequently be updated if or when the need arose. Preferably this information would be stored in a separate memory area to that in which the turning instructions are displayed.

The initial transmission to the terminal may, therefore, include information on the whole route, for example, time and distance to destination, points of interest etc. At the same time or subsequently, the first turning instructions of the route would be downloaded. The bit maps could be stored in a specific memory location. The cards providing this information could contain e.g. the name of the street after the turning instruction, the actual street name, a small bitmap for indicating the turning direction and the distance to this next turning instruction. This card could be displayed on the screen (see FIG. 6b).

Once a card is displayed the terminal checks to see if this is the last card of the deck 404. If this is not the case then the terminal determines if the turning point has been reached using dedicated WMLScript functions. The card provides the turning point in cartesian coordinates, the terminal calculates its own Cartesian coordinates with reference to location information received-via GPS or other means by the location module and compares its present location with that of the turning point 405. When these coincide, the terminal determines that the turning point has been reached and the next route segment is displayed if the end of the route has not been reached 406.

The next card is then requested, for example using the WML Browser go function to download the next segment 402 and then displayed 403. The procedure continues until the last card in the deck has been displayed. As soon as the last card has been displayed 404, the terminal checks if the deck is the last deck 407. This can be done by determining if there is a link to a next deck. If it is the last deck the last card will be displayed 408 when the turning point is reached. The exact display can then be determined by the service provider. This will be a bit map that may also be sent by the service provider. If the deck is not the last deck 407, the terminal requests a new deck from the service provider. This will be the next deck stored 402.

The service provider will receive a request for the next deck 505, and will send the next deck 506 to the requesting terminal over the network 3. The deck that has been sent to a terminal and a delivery receipt received back can be deleted at the service provider at an appropriate time 508. A check is made to see if the final deck has already been sent 509, if it has the process is at an end 510. If not the service provider waits for another request for a new deck or amended route 505. The terminal will store the next deck and display the next card 403, that will be the first card of the new deck when the traveller reaches the turning point of the last card of the previous deck. Once the next deck has been transmitted the service provider may delete that deck. The criteria laid down for determining if a deck should be deleted will be a matter for the service provider.

The route will be downloaded and stored at the terminal segment by segment until the final destination has been reached, or the traveller departs from the route.

If the turning point is not reached 405 or if the distance to the next turning point is increasing, the traveller may have taken a wrong turn at the previously displayed junction the terminal determines if an error has occurred. The service provider can then send a special WML deck that lets the traveller know something is wrong. When there has been an error 411, a request for a revised route can be made 412 automatically to achieve the original destination in the most effective manner from the current position. When a new route request is made to the service provider 511, the route from the current start point to the original destination is recalculated 512 and the decks containing the individual turning instructions are updated in the store at the service provider 515.

Alongside this process, the service provider is also able to recalculate the remaining route in response to changes in traffic conditions at any point during the journey 513. The route segments affected can be updated with new instructions 514. As the terminal will not have received the information stored at the service provider, the new route will be provided to the terminal segment by segment instead of the original. The terminal can be completely unaware of the change in route. Updates to the route can be made at intervals under the control of the service provider.

Although the traveller is unaware of the change in route it may have consequences to the time of arrival or number of miles to the destination. If this is the case it may be desirable to convey the changes in 'time' and 'mileage' 'to destination' information to the terminal in the next deck sent by the service provider after the route has been updated. This may also be desirable when the route is updated because of a navigation error by the traveller him/herself.

In the above described and other embodiments of the invention, the decks of cards or other form of segments may be transferred to the terminal in one of many ways, a point-to-point communication like Current Switched Data (CSD) could be used although no parallel voice communication is possible. They could also be transferred using a WAP push addressed to the terminal via, for example in the GSM network the SMS (Short Message Service), USSD (Unstructured Supplementary Service Data) or when it is operational the GPRS (General Packet Radio Service).

In other embodiments of the present invention less turning instructions may be provided in each segment, with the remainder of the available memory holding corrections for return to the route if a deviation occurs. This would mean that more segments would be required to complete the route but that more of the route would be held at the service provider where it can be updated. In the deck analogy, one or perhaps two cards of a deck would hold turning instructions the remainder of the cards would contain proximity information. 'Proximity' information is information on the road (or other e.g. pathway) network surrounding the suggested route. This allows additional instructions to be provided to the user when deviations from the route are detected until the user has returned to the suggested route.

Using the scripting language WMLS provides the advantage that a terminal can readily calculate the distance between its actual position provided by the location module and the position of the turning points of the deck. A turning point indicates that a new WML card or deck should be displayed on the screen.

The final card of the deck will look slightly different to the other cards in the deck. Instead of pointing to the next card in the deck (e.g. ./deck–.n.wml#cardx). It will point to the next WML deck saved at the service provider, e.g. ./deck–n+l.wml. If the distance to the next turning point is sufficient for connection to be made and the next WML deck downloaded, the transition will be seamless.

When a deck is downloaded to the terminal, each of the cards is stored in memory. The GPS module is used to calculate a current position of the terminal in Cartesian coordinates. Each card carries the Cartesian coordinates of the turning point, and the last card of the deck will have a link to the next deck. The terminal can then calculate the distance to the next turning or point. When the turning point is reached ie there is a coincidence between the current position calculated by the location module and the turning point on the displayed card, the next card with the next turning instruction can be displayed.

In embodiments of the invention, if the turning instructions within one segment of the route description alternate in a short period of time, as it is the case e.g. in a densely populated area, the connection to the service provider may have to always be maintained.

This effect could be reduced by saving the most common icons for the navigation inside a separate cache on the terminal side. The information downloaded from the service provider would not need to include all the information for how to display the icons, just data sufficient to identify the icon. This method of saving data to a separate memory area within the terminal is specified by WAP Wireless Markup Language Specification, Version 1.2, WAP Forum, 08 Nov. 1999.

An advantage of downloading relatively little information in each deck is that the turning instructions, which are saved on the service provider side and which are still not downloaded to the WAP terminal, can be updated whenever for example, road conditions change. Systems in accordance with this invention are truly dynamic and are able to react to a continuously changing external environment such as the traffic situation.

Embodiments of the invention using WAP for the dynamic navigation system have the advantage of using a widely available standardized protocol. This provides advantages over proprietary solutions in terms of universality.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

The invention claimed is:

1. A navigational system comprising:
   means for calculating a route from a start location to a destination;
   means for dividing the calculated route into segments, where each segment represents a portion of the calculated route beginning at a first point in the route and ending at a second point in the route;
   means for storing the respective segments;
   a mobile navigation terminal remote from the stored segments;
   means for sequentially delivering the respective stored segments to the mobile navigation terminal at respective points in the calculated route; and
   means for updating, in response to changes in traffic conditions, the stored segments that have not been delivered to the terminal by calculating a route from the first point of the next segment to be delivered, to the destination, dividing the calculated route into segments, and storing the respective segments in place of the stored segments.

2. A navigational system according to claim 1 wherein the respective segments are delivered in response to respective requests from the terminal.

3. A navigational system according to claim 1 wherein the respective points in the calculated route are locations on the route.

4. A navigational system according to claim 1 wherein the mobile terminal requests a subsequent segment when a predetermined route point in the previous segment is reached.

5. A navigational system according to claim 1 wherein the mobile terminal stores a segment received and outputs information.

6. A navigational system according to claim 1 wherein a segment previously received by the mobile navigation terminal is overwritten by one subsequently received.

7. A navigational system according to claim 1 wherein the means for storing is located in a centralized processor.

8. A navigational system according to claim 1 wherein delivered segments are removed from the stored segments.

9. A navigational system according to claim 1 wherein the route is recalculated in response to a departure of the terminal from the calculated route.

10. A navigational system according to claim 1 wherein the route is recalculated in response to a change in conditions external to the terminal.

11. A navigational system according to claim 1 wherein the route is recalculated in response to a request from the terminal.

12. A navigational system according to claim 1 wherein the updated segments replace the previously stored segments.

13. A navigational system according to claim 1 wherein each segment is stored as a WAP deck.

14. A navigational system according to claim 1 wherein the deck is formed from a plurality of cards.

15. A navigational system according to claim 1 wherein the route includes proximity information.

16. A terminal for operation in the system of claim 1.

17. A service provider for operation in the system of claim 1.

18. A navigational system according to claim 1, wherein each segment comprises a portion of the calculated route and a decision point in the calculated route.

19. A navigational system according to claim 1, wherein each segment comprises a bitmap.

20. A navigation system as according to claim 1, wherein the mobile terminal comprises means for implicitly informing the server of its position by requesting a segment, thereby facilitating recalculation of the remaining route.

21. A navigation system according to claim 1, wherein the calculated route comprises a main route from the start location to the destination and correction information describing a return to the main route if a deviation from the main route occurs.

22. A method of providing route information to a remote terminal comprising:
   calculating a route from a start location to a destination;
   dividing the calculated route into segments, where each segment represents a portion of the calculated route beginning at a first point in the route and ending at a second point in the route;
   storing the respective segments;
   sequentially delivering the respective stored segments to the mobile navigation terminal at respective points in the calculated route; and
   updating, in response to changes in the traffic conditions, the stored segments that have not been delivered to the terminal by calculating a route from the first point of the next segment to be delivered, to the destination, dividing the calculated route into segments,
   and storing the respective segments in place of currently stored segments.

23. A method of remotely receiving a route from a start location to a destination in segments from a remote service provider, comprising:

receiving a first route segment of a first route from a remote service provider, where the first route is from a start location to a destination and is divided into a sequence of segments, each segment representing a portion of the first route beginning at a first point in the first route and ending at a second point in the first route;

determining the current location on the first route;

requesting a subsequent segment of the first route from the remote service provider that follows the first route segment in the sequence of segments; and receiving, in response to the request for the subsequent segment of the first route, a subsequent segment of the first route if there are no changes in traffic conditions, or, if there are changes in traffic conditions, receiving a segment of a second route, the second route being from the first point of the said subsequent segment of the first route to the destination by a route other than that defined for the first route, between the first point of the said subsequent segment of the first route and the destination.

24. A navigation system comprising:

means for calculating a route from a start location to a destination;

means for dividing the calculated route into segments, where each segment represents a portion of the calculated route beginning at a first point in the route and ending at a second point in the route;

means for storing the respective segments;

a mobile navigation terminal remote from the stored segments;

means for sequentially delivering the respective stored segments to the mobile navigation terminal at respective points in the calculated route;

means for detecting if the mobile navigation terminal deviates from the calculated route;

means for updating, in response to the mobile navigation terminal deviating from the calculated route, the stored segments that have not been delivered to the terminal by calculating a second, different, route to be delivered, the start point of the second route depending on the deviation of the terminal and ending at the destination, dividing the second calculated route into segments, and storing the respective segments in place of currently stored segments.

25. A navigational service provider comprising:

means for calculating a route from a start location to a destination;

means for dividing the calculated route into segments, where each segment represents a portion of the calculated route beginning at a first point in the route and ending at a second point in the route;

means for storing the respective segments;

means for sequentially delivering the respective stored segments at respective points in the calculated route; and means for updating, in response to changes in traffic conditions, the stored segments that have not been delivered by calculating a route from the first point of the next segment to be delivered, to the destination, dividing the calculated route into segments, and storing the respective segments in place of the currently stored segments.

26. A navigational service provider according to claim 25 wherein the respective segments are delivered in response to respective requests from the terminal.

27. A navigational service provider according to claim 25 wherein the respective points in the calculated route are locations on the route.

28. A navigational service provider according to claim 25 wherein means are provided for updating the stored segments.

29. A navigational service provider according to claim 25 wherein the stored segments are updated in response to changes to the route.

30. A navigational service provider according to claim 25 wherein the changes to the route are in response to a change in the traffic situation.

31. A navigational service provider according to claim 25 wherein the stored segments are updated in response to a request from a remote terminal.

32. A navigational service provider according to claim 31 wherein the request from the terminal indicates a current location off the calculated route and the updated stored segments provide a route from the current location to the destination.

33. A navigational service provider according to claim 25 wherein the segments delivered to the navigation terminal are subsequently deleted.

34. A navigational service provider according to claim 25 wherein the segments are stored as individual decks according to the Wireless Application Protocol.

35. A navigational service provider according to claim 34 wherein the deck is formed from a plurality of cards.

36. A navigational service provider according to claim 35 wherein each card of the deck holds one turning instruction.

37. A navigational service provider according to claim 36 wherein each turning instruction forms part of the route progressing from the start point to the destination.

38. A navigation terminal comprising:

means for providing a current location;

means for receiving a first route segment of a first route from a remote service provider, where the first route is from a start location to a destination and is divided into a sequence of segments, each segment representing a portion of the first route beginning at a first point in the first route and ending at a second point in the first route;

means for storing the received first route segment;

means for providing route guidance from the stored first route segment;

means responsive to the current location for requesting a subsequent segment of the first route from the remote service provider that follows the first route segment in the sequence of segments; and means for receiving, in response to the requesting the subsequent segment of the first route, a subsequent segment of the first route if there are no changes in traffic conditions, or, if there are changes in traffic conditions, receiving a segment of a second route, the second route being from the first point of the said subsequent segment of the first route to the destination by a route other than that defined for the first route, between the first point of the said subsequent segment of the first route and the destination.

39. A navigation terminal according to claim 38 wherein the means for determining the current location is an onboard location module.

40. A navigation terminal according to claim 38 wherein a previously stored route segment is overwritten with a subsequently received route segment.

41. A navigation terminal according to claim 38 wherein the means for providing route guidance comprises a display.

42. A navigation terminal according to claim 38 wherein the means for requesting a subsequent route segment comprises means for comparing the current location of the terminal with the turning point.

43. A navigation terminal according to claim 42 wherein the Cartesian coordinates of the current location are compared with the Cartesian coordinates of the turning point.

44. A navigation terminal according to claim 38 wherein the terminal is WAP enabled terminal.

45. A navigation terminal comprising:
   means for providing a current location;
   means for receiving a first route segment of a first route from a remote service provider, where the first route is from a start location to a destination and is divided into a sequence of segments, each segment representing a portion of the first route beginning at a first point in the first route and ending at a second point in the first route;
   means for storing the received first route segment;
   means for providing route guidance from the stored first route segment;
   means for detecting if the navigation terminal deviates from the calculated route;
   means for requesting a second route in response to the navigation terminal deviating from the first route, the start location of the second route depending on the deviation of the navigation terminal and ending at the destination; and
   means for receiving a route segment of the second route.

* * * * *